May 21, 1963     M. L. BOYER     3,090,913

IMPEDANCE MEASURING APPARATUS

Filed July 15, 1959

Inventor
Marcel L. Boyer
By Ralph B. Stewart
Attorney 3,090,913
Patented May 21, 1963

3,090,913
IMPEDANCE MEASURING APPARATUS
Marcel Louis Boyer, Chatillon-sous-Bagneux, France, assignor to L'Electronique Appliquee, Paris, France
Filed July 15, 1959, Ser. No. 827,340
Claims priority, application France July 17, 1958
7 Claims. (Cl. 324—57)

The present invention concerns improvements in or relating to impedance measuring apparatus giving directly displayed readings of the values of the modulus or amplitude and argument, or angle of phaseshift, of any electrical impedance component or device connected thereto.

An object of the invention is to provide an impedance measuring apparatus which may operate over a broad range of impedance values and an extended band of frequencies, without taring in a wide portion at least of the frequency band, and with a single meter scale on the modulus indicator in the device.

A further object of the invention is to provide this apparatus with the additional view of using it for also measuring such parameters as relative phaseshifts of signals, attenuation characteristics of networks and frequency responses of quadripoles.

An impedance measuring apparatus according to the invention is mainly characterised in that it comprises the combination of a signal forming head or input network supplied with a reference oscillation processed therein in accordance with the value of an impedance under study and the value of an impedance of reference for deriving from said oscillation two signals respectively proportional to the said impedance values, two identical amplification channels receiving said processed signals, a modulus or amplitude meter connected between symmetrical points of the said channels and further means in the said channels for further processing the signals and to actuate therefrom a relative phase-shift measurement.

This and further features will be described with respect to an example of a practical embodiment according to the invention with reference to the accompanying drawings, wherein.

Figure 1:
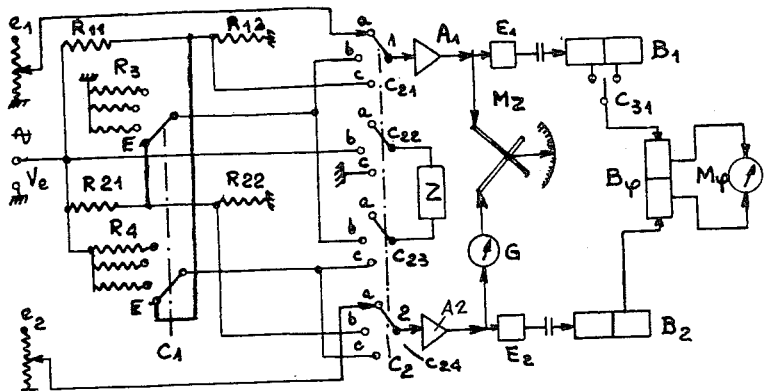
FIG. 1 shows a block schematic arrangement of this embodiment.

Referring to FIG. 1, two symmetrical and actually identical amplification channels start from the terminals 1 and 2. Each channel includes first an amplifier, $A_1$ from terminal 1, $A_2$ from terminal 2. The outputs of said amplifiers are connected to respective inputs of a meter of the ratio-meter kind, $M_Z$, which will give a reading of the value of the modulus or amplitude of any impedance Z under study. In one of the input leads to $M_Z$ is inserted a galvanometer G.

Figure 3:
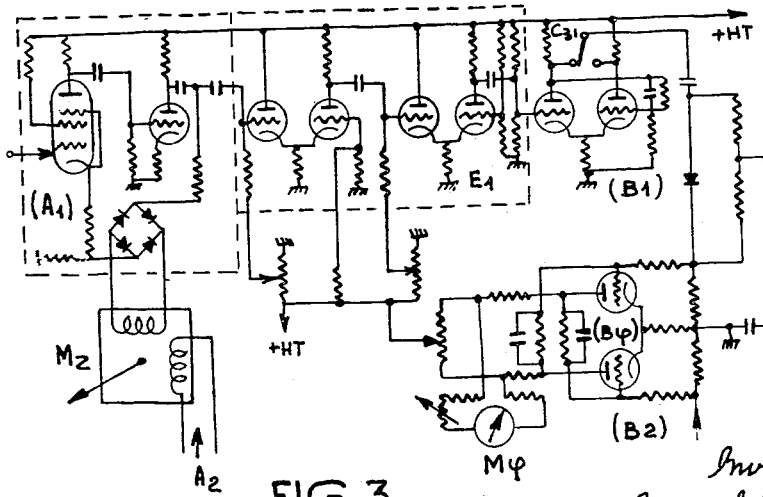
FIG. 3 shows an illustrative circuit diagram of part of the embodiment of FIG. 1; and, FIG. 4 shows graphs to be used in the explanation of the operation of part of the said embodiment.

Amplifiers $A_1$ and $A_2$ are identically provided and each includes a high value current feedback so that their response (output current vs. input voltage) is of great linearity. FIG. 3, part $A_1$, shows an example of circuitry for such a high linear response amplifier. It includes two cascaded amplifier stages, the first of which uses a pentode tube and comprises a current feedback loop through a rectifier bridge. The other diagonal of the bridge is connected across the corresponding winding of the ratio-meter $M_Z$ so that this winding is supplied with the average output current from the amplifier, which is proportional to the input voltage.

Figures 2, 4:
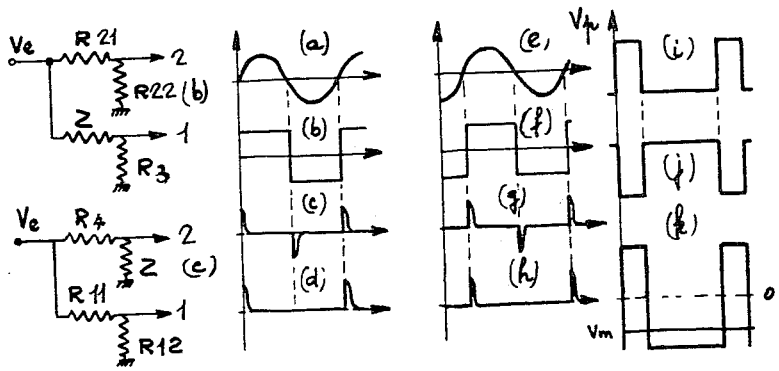
FIG. 2 shows two circuit diagrams relating to the signal forming head in this embodiment.

Each one of the amplification channels then includes a clipper-limiter stage, $E_1$ from $A_1$ and $E_2$ from $A_2$. As seen from FIG. 3, the circuitry of such a clipper-limiter arrangement may be quite conventional. The sine signals shown at (a) and (e) in FIG. 4 are thus converted into substantially rectangular signals. The shaping however is not sufficient for their final use. Consequently, the output of the clipper-limiter circuit $E_1$ drives a Schmitt bistable circuit $B_1$ and the output of the circuit $E_2$ similarly drives a Schmitt bistable circuit $B_2$. The waveforms from such Schmitt circuits are then purely rectangular, as shown in graphs (b) and (f) of FIG. 4.

These waveforms are differentiated producing the waveforms as shown in graphs (c) and (g) of FIG. 4 before being applied to separate control inputs of a flip-flop device $B_\varphi$, as shown in FIGS. 1 and 3, the derivated pulses of a predetermined polarity or direction being short-circuited as shown by the diodes inserted in the said inputs of the flip-flop device $B_\varphi$. The control of $B_\varphi$ is ensured by the two series of pulses shown in graphs (d) and (h) of FIG. 4. This control actuates the flip-flop which delivers plate voltages such as (i) and (j) of FIG. 4. In these rectangular waveforms, of opposite directions of variations, the signals vary between two constant value levels, a lower one, $+V_1$ and a higher one, $+V_2$. A voltmeter $M_\varphi$ is connected across the plates of the flip-flop. This voltmeter will be submitted to an A.C. drive the half-cycles of which have widths varying in accordance with the recurrence periods of the control pulses, viz. to the relative phaseshift between the pulses of the two actuating series. Consequently, the change of amplitude-modulated signals into pulse position modulated signals enables the direct reading on $M_\varphi$ of the value of argument or phase shift of the impedance to study, as is apparent since $M_\varphi$ measures the value of the D.C. component (reinforced line in graph (k) of FIG. 4) which is representative of the said phase shift.

It must be noted that when this phaseshift is zero or 180°, the D.C. component V is zero. Further, when the direction of phaseshift changes, so changes the direction of the said D.C. component. The device then enables a direct indication of the "sign" of the phaseshift, which is important since it demonstrates the character either capacitive or inductive of the impedance under study. There is, however, a difficulty because in practice such a phase metering arrangement does not operate for zero value or for values neighbouring zero. The signals in the channels are coincident or nearly coincident in time. The flip-flop is not stable in such a case. However, this may be remedied by introducing a 180° systematic phaseshift in one only of the channels, for instance at the level of the Schmitt bistable device. A switch $c_{31}$ enables the operator to produce such a reversal when required, by permitting the signal to one input of the flip-flop to be selected from the one or the other of the plate outputs of $B_1$.

With this additional switching arrangement, the phasemeter included in the impedance measuring apparatus may then indicate small values of phaseshift neighbouring zero and the zero value itself without any loss of accuracy.

During the use of the apparatus, terminals 1 and 2 will receive signals the voltage value of which is due to remain within certain predetermined limits so that the output currents from the amplifiers be neither too high nor too low as applied to the windings of $M_Z$. If these currents were of a too high value, from too high voltages at 1 and 2, the response would become non-linear. If these currents were too low, the accuracy of the measure would be damaged. The provision of a galvanometer G in one of the leads to the meter $M_Z$ enables the operator to detect such undesirable conditions so that he could remedy by adjusting the level of the input signals at 1 and 2 and reinstate normal operating conditions for the apparatus.

The head of the apparatus, or the input network on the left-hand side of terminals 1 and 2 in FIG. 1, has an input terminal $V_e$, receiving an A.C. voltage from a reference source (not shown), the frequency and voltage of which may be adjustable, and includes a pair of voltage dividers, $R_{11}$—$R_{12}$ and $R_{21}$—$R_{22}$ respectively, a first set of resistors $R_3$, a second set of resistors $R_4$, a selection switch $C_1$ for these sets of resistors, and a combination switch $C_2$ having four banks of three terminals each. These banks are noted $c_{21}$, $c_{22}$, $c_{23}$, $c_{24}$, and the terminals are noted $a$, $b$ and $c$.

Position $a$ of the combination switch will be later discussed. In such position $a$, however, it must be noted that the contacts of $c_{22}$ and $c_{23}$ connected to the terminals of the impedance $Z$ to study, are unconnected to any circuit in the head or input network.

The connections of the other terminals in $C_2$ are as follows: terminal $c$ of bank $c_{21}$ is connected to the intermediary tap of voltage divider $R_{11}$—$R_{12}$, terminal $b$ of bank $c_{24}$ is connected to the intermediary tap of voltage divider $R_{21}$—$R_{22}$. Terminals $b$ of banks $c_{21}$ and $c_{23}$ are simultaneously connected to that armature of $C_1$ relating to resistors $R_3$. Terminals $c$ of banks $c_{23}$ and $c_{24}$ are simultaneously connected to the armature of contact $C_1$ relating to resistors $R_4$.

The switch $C_1$ actually is a range commutator or selector switch. All that may be noted concerning this switch as to a pecularity thereof is that it includes a position E which is to be used to effect an equilibrium of the channels before operation of the apparatus. The terminal E in the set $R_3$ is connected to the intermediary tap of divider $R_{21}$—$R_{22}$. The terminal E in the set $R_4$ is connected to the intermediary tap of $R_{11}$—$R_{12}$. Resistors $R_{11}$ and $R_{21}$ may advantageously be provided as adjustable resistors. The equilibrium or balancing of the channels is effected by an adjustment of the feedback ratio in the amplifiers $A_1$ and $A_2$; in this respect, an adjustable resistance is shown in FIG. 3 in such a feedback circuit.

All terminals from resistances $R_3$ opposite to those cooperating with the armature of $C_1$ are grounded. All terminals from resistances $R_4$ opposite to those cooperating with the other armature of $C_1$ are connected to the input reference terminal of the head. Of course, the unshown reference generator must have a terminal to the ground, as indicated in the drawing by a ground at the other terminal than the one to which are connected the circuitry of the head or input network.

When switch $C_1$ is in any other position than those corresponding to E in sets $R_3$ and $R_4$, one of the resistors $R_3$ and a corresponding one of the resistors $R_4$ are selected. When further switch $C_2$ is on position $b$ with an impedance $Z$ connected as shown, the electric diagram of the head is such as shown in ($b$) of FIG. 2. When, in the otherwise same conditions switch $C_2$ is on position $c$, the electric diagram of the head is such as shown at ($c$) in FIG. 2.

Considering first the position $c$ of $C_2$, circuit diagram ($c$) in FIG. 2, the input voltage at 2 is:

(i) $\qquad V_z = V_e . Z/(R_4 + Z)$ and, provided $R_4$ is of an order of value much higher than $Z$, for instance of the order of a hundred times $Z$ or more, relation (i) is substantially equivalent to:

(ii) $\qquad V_z = V_e . Z/R_4$ $Z$ being a complex impedance, viz. of the form $R+jX$, the argument of the impedance, i.e. the phaseshift introduced with respect to $V_e$ substantially is:

(iii) $\qquad \varphi = \arctan X/R$

The input voltage on terminal 1 will preserve the phase of $V_e$ and has its value defined by the ratio of the fixed resistance divider, viz.:

(iv) $\qquad V_r = V_e . R_{12}/(R_{11}+R_{12}) = V_e . Q$

Q denoting the said divider ratio.

The meter $M_z$ will display the value of the ratio of the said input voltages $V_z$ and $V_r$. It will of course be scaled in ohms. The phasemeter will give the value of $\varphi$. As the input of the apparatus is asymmetrical, one terminal to ground, there is no stray effect from the capacity in the head.

However, this arrangement, if used alone, could not give the accuracy of the measurement in any range of resistance values, since for a high value of $Z$, $R_4$ should be made of a practically unobtainable value.

When dealing with impedances $Z$ of high value, the operator switches $C_2$ to position $b$, circuit ($b$) of FIG. 2. All advantages are preserved and, further, an interversion of the amplification channels from the signals developed in the head is so ensured as to re-establish the correct direction of the phaseshift measured by $M\varphi$ (otherwise, the direction and value of this phaseshift would have been "complemented"). This enables a single scale to be set on $M\varphi$.

With $C_2$ on position $b$, the input terminal 1 receives a voltage:

(v) $\qquad V_z = V_e . R_3/(R_3 + Z)$ and as $R_3$ is far smaller than $Z$ in this case, concerning the orders of values of $Z$ and $R_3$, this relation (v) substantially reduces to:

(vi) $\qquad V_z = V_e . (R_3/Z)$

Terminal 2 of the amplification channel then receives a voltage:

(vii) $\qquad V_r = V_e . R_{22}/(R_{21}+R_{22}) = V_e . P$ denoting P the ratio of this divider.

The meter $M_z$ gives the ratio of the voltages on terminals 1 and 2. For position $b$, this ratio $\alpha$ is:

(viii) $\qquad \alpha = P . Z/R_3$ and for position $c$, this ratio is:

(ix) $\qquad \alpha = Z/(R_4 . Q)$

For measuring with the same reading scale on $M_z$ values of $Z$ one hundred times, for instance, higher in a case than in the other one, it will suffice to provide that, in the circuitry of the head, $100 . Z$ according to relation (iv) is equal to $Z$ according to relation (viii), viz.:

(x) $\qquad 100 . R_4 . Q . P = R_3$ and, more generally speaking, denoting $n$ as the required ratio of the value order of the impedances to study:

(xi) $\qquad n . R_4 . Q . P = R_3$

Now, as previously stated, there is a position $a$ for the switch $C_2$ wherein the impedance $Z$ is disconnected as well as the sets of resistors and voltage dividers from terminals 1 and 2. In this position $a$, the terminals 1 and 2 are merely connected to taps of attenuators $e_1$ and $e_2$. For instance these attenuators may be of the kind varying by degrees, and for instance are calibrated to vary from 5 decibles between each tap. This means that the apparatus may as well be used for additional purposes than for measuring impedances. Two separate signals may be applied to the attenuators and $M\varphi$ will give the phase shift between these signals. A quadripole may be connected across the attenuators and fed by a reference voltage. The change of frequency of this voltage will enable study of the response characteristic of said quadripole. $M_z$ may have a decible scale too, for such a purpose. Attenuation measurements may also be made by connecting the outputs of transmission circuits and devices to the inputs of the attenuators $e_1$ and $e_2$; a.s.o.

I claim:

1. Apparatus for measuring the impedance value and the phase angle of an unknown impedance comprising, in combination, a source of oscillations comprising a generator having one terminal thereof grounded, an input network energized from the other terminal of said generator and including two branch circuits, one branch circuit including a reference impedance embodied in a first fixed-resistance voltage divider and the other branch circuit including a second voltage divider formed of the unknown impedance to be measured and a first standard impedance, said branch circuits producing at the outputs of said voltage dividers two signals proportional respectively to the impedance values of said reference impedance and said unknown impedance, two identical amplification channels controlled by said signals of said branch circuits, respectively, a ratiometer connected to be energized between symmetrical points on said two channels for indicating the ratio of the amplified signals in said two channels, a phase meter having two inputs energized respectively from the outputs of said amplification channels and indicating the relative phase shift between the signals in said two channels produced by the unknown impedance connected in one of said branch circuits, a third voltage divider formed of fixed-resistances of different resistance values from said first fixed-resistance divider, a second standard impedance of a different value from said first standard impedance, and a multiple-contact switch for establishing in one position thereof the connections of said first and second dividers in said branch circuits and, in another position thereof connecting said second fixed-resistance divider in said other branch circuit instead of said second voltage divider, and simultaneously connecting said unknown impedance and said second standard resistance in a fourth voltage divider connection in said one branch circuit, and disconnecting said first fixed-resistance divider, said unknown impedance and said second standard resistance being reversed in positions in said fourth voltage-divider connection from the positions occupied by said unknown impedance and said first standard impedance in said second voltage divider connection.

2. An impedance measuring apparatus according to claim 1 wherein said pair of standard resistors includes further standard resistors to form sets of standard resistors and a range selecting switch connected to select a pair of corresponding standard resistors in said sets prior to the operation of the combination switch, the ratio of values of corresponding standard resistors in the said sets being maintained constant during the said range selection switching.

3. An impedance measuring apparatus according to claim 2, wherein the ratio of the standard resistors in said sets is proportional by a predetermined constant coefficient to the product of the ratios of the fixed resistance voltage dividers.

4. An impedance measuring apparatus according to claim 2, including a ground connection for one end of the standard resistors of one set, means to connect the other end to a terminal of the range selection switch, means connecting one end of the standard resistors in the other set to the input terminal of the input network and means to connect the other end to a terminal of the said range selection switch.

5. An impedance measuring apparatus according to claim 2, including additional means on said range selection switch to provide an additional position wherein to disconnect the sets of standard resistors from the terminals of the combination switch.

6. An impedance measuring apparatus according to claim 1, including a pair of attenuators, means for directly connecting said pair of attenuators to the output terminals of the said branch circuits of said input network and simultaneously disconnecting therefrom all other circuits of the input network.

7. Apparatus for measuring the impedance value and the phase angle of an unknown impedance comprising, in combination, an input terminal connected to a source of oscillations, an input network comprising two branch circuits connected to said terminal, one branch circuit including a reference impedance embodied in a first fixed-resistance voltage divider and the other branch circuit including a second voltage divider formed of the unknown impedance to be measured and a first standard impedance, said branch circuits producing at the outputs of said voltage dividers two signals proportional respectively to the impedance values of said reference impedance and said unknown impedance, two identical amplification channels controlled by said signals of said branch circuits, respectively, a ratio-meter connected to be energized between symmetrical points on said two channels for indicating the ratio of the amplified signals in said two channels, a phase meter having two inputs energized respectively from the outputs of said amplification channels and indicating the relative phase shift between the signals in said two channels produced by the unknown impedance connected in one of said branch circuits, each channel including means for converting amplitude-modulated and phase-modulated signals into position-pulse-modulated signals, each channel also including a Schmitt-type trigger circuit for shaping and differentiating said position-modulated pulses, a flip-flop device having inputs to which are applied pulses from said Schmitt-type trigger circuits, said phasemeter being connected across the outputs of said flip-flop for indicating the relative phase shift between the two series of input pulses, by the measurement of the d.c. component of the voltage across said flip-flop outputs, and switching means for selectively applying to one of the flip-flop inputs either the signal from one or the other of the respective plates of the corresponding Schmitt-type trigger circuits.

References Cited in the file of this patent

UNITED STATES PATENTS

| | | |
|---|---|---|
| 2,558,945 | Fritzinger | July 3, 1951 |
| 2,622,127 | Alsberg et al. | Dec. 16, 1952 |
| 2,806,295 | Ball | Sept. 17, 1957 |

OTHER REFERENCES

Kretzmer, "Measuring Phase at Audio and Ultrasonic Frequencies," Electronics, October 1949, pp. 114–118.

Holtje et al., "Experimenter," General Radio, April 1956, vol. 30, No. 11.